Dec. 18, 1962     R. A. DOW     3,069,037
REFUSE DISPOSAL AND GENERAL TRUCK BED
Filed Jan. 25, 1960     9 Sheets-Sheet 1

INVENTOR
RAY A. DOW

BY *John H. Widdowson*

ATTORNEY

Dec. 18, 1962  R. A. DOW  3,069,037
REFUSE DISPOSAL AND GENERAL TRUCK BED
Filed Jan. 25, 1960  9 Sheets-Sheet 2

INVENTOR.
RAY A. DOW
BY John H. Widdowson
Attorney

Dec. 18, 1962     R. A. DOW     3,069,037
REFUSE DISPOSAL AND GENERAL TRUCK BED
Filed Jan. 25, 1960     9 Sheets-Sheet 3

INVENTOR.
RAY. A. DOW
BY John H. Widdowson
attorney

Dec. 18, 1962 R. A. DOW 3,069,037
REFUSE DISPOSAL AND GENERAL TRUCK BED
Filed Jan. 25, 1960 9 Sheets-Sheet 4

INVENTOR.
RAY A. DOW
BY
John H. Widdowson
Attorney

Dec. 18, 1962 R. A. DOW 3,069,037
REFUSE DISPOSAL AND GENERAL TRUCK BED
Filed Jan. 25, 1960 9 Sheets-Sheet 5

INVENTOR.
RAY A. DOW
BY

Dec. 18, 1962 R. A. DOW 3,069,037
REFUSE DISPOSAL AND GENERAL TRUCK BED
Filed Jan. 25, 1960 9 Sheets-Sheet 7
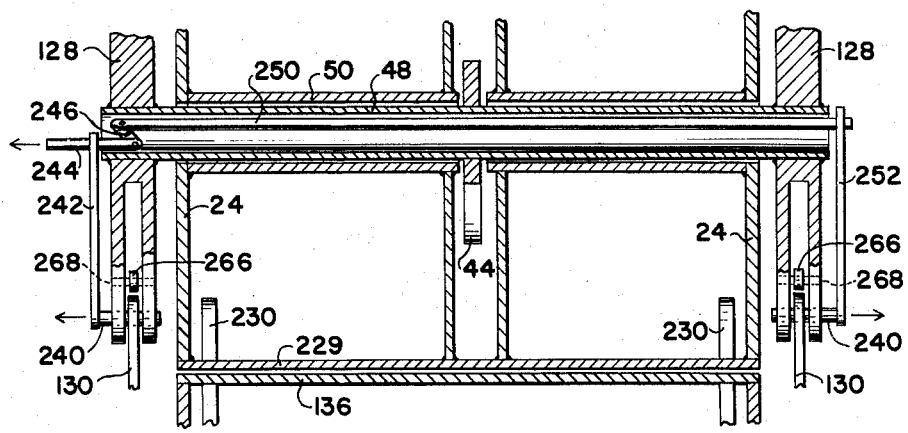
FIG. 15
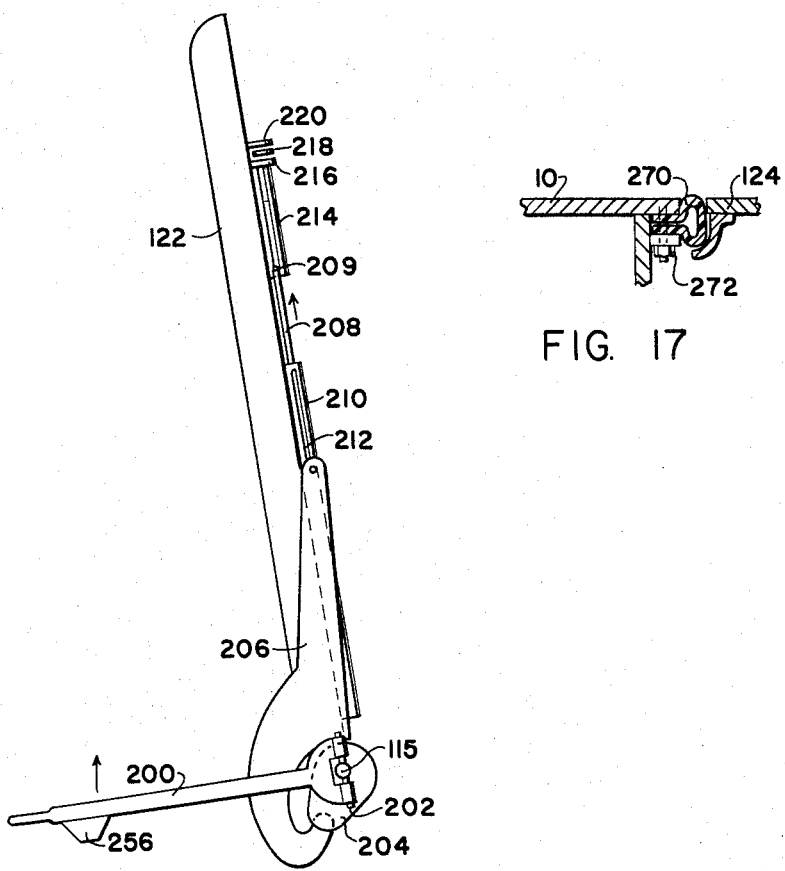
FIG. 16
FIG. 17
INVENTOR.
RAY A. DOW
BY

INVENTOR.
RAY A. DOW

Dec. 18, 1962 R. A. DOW 3,069,037
REFUSE DISPOSAL AND GENERAL TRUCK BED
Filed Jan. 25, 1960 9 Sheets-Sheet 9

INVENTOR.
RAY A. DOW
BY John H. Widdowson
attorney

United States Patent Office 3,069,037
Patented Dec. 18, 1962

3,069,037
REFUSE DISPOSAL AND GENERAL
TRUCK BED
Ray A. Dow, 501 N. 1st St., Fairview, Okla.
Filed Jan. 25, 1960, Ser. No. 4,380
3 Claims. (Cl. 214—504)

This invention relates generally to the art of loading. More particularly it relates to self-loading and unloading mechanism for vehicles. More particularly this invention relates to self-loading and unloading mechanism for self-propelled wheeled vehicles particularly designed to pick up and haul for disposal refuse material such as trash, garbage and the like.

The devices disclosed herein are an improvement over those disclosed in Patent No. 2,750,056, granted to me on June 12, 1956.

Self-propelled vehicles having a loading apparatus and, in some cases, having means incorporated therein for dumping, are generally known in the prior art. The loading and dumping mechanism is usually operated by separate mechanisms requiring additional structural and design problems, and in many cases duplicate power means which are used during only one part of the operation. Furthermore many of the prior art devices fail to provide a means for moving the material from the end in which it is loaded to the remote end of the body. This prevents full use of the bed or body with a subsequent decrease in efficiency and economy. Also many of the prior art devices have the operating mechanism projecting through the bottom of the bed or body which permits unsanitary liquids received in the body during the loading operation to thus drain onto the street. This last feature causes objections by many health departments throughout the country, which in turn prohibits sale and use of this type of truck in these cities.

In accordance with the present invention, a new and improved device has been provided which overcomes the objections of the prior art. Means have been incorporated in the present invention to allow loading and unloading of the device by use of the same power mechanism and, generally, the same cooperating parts. Means have also been provided for moving material deposited in the bed or body from the end near which it is received to the remote end of the body. In this connection, means have also been provided at the top of the body or bed to prevent trash from falling out of the top side of the body during the loading operation. The operating mechanism in the present invention is positioned at the sides, bottom or backside of the body or bed, thereby allowing the lower portion of the carrier to be watertight. The loading and unloading mechanism of the present device is preferably operated by a single hydraulic motor, thereby preventing duplicate power supplies often present in the prior art devices. The novel hydraulic system of this invention is so arranged that a part of the thrust is directed in a vertical direction against the bottom of the bed to aid in the initial stage of dumping the bed. The bed or body of this invention can be secured to any suitable self-propelled vehicle, such as an ordinary truck frame. The loading and unloading operations may be performed by a single operator from either side of the vehicle or from the cab of the carrier vehicle. Linking means have been provided which vary the speed of the motor of the truck automatically during the loading and unloading operations.

It is an object of this invention to provide a new loading and unloading mechanism for a body.

Another object of this invention is to provide new loading and unloading mechanism particularly suitable for loading trash and other refuse.

A still further object of this invention is to provide an improved refuse disposal truck incorporating self-loading and unloading features operated from the same power source.

A still further object of this invention is to provide self-loading and unloading mechanism for self-propelled vehicles with the operating mechanism so arranged that the body of the mechanism may be sealed to be watertight.

An additional object of this invention is to provide means within the body of the truck which operate to force material toward the end of the body remote from the loading operation.

Another object of this invention is to provide a new and improved hydraulic system which is used in both the loading and unloading operations.

Other objects and advantages of my invention will become apparent to one skilled in the art upon reading this disclosure.

Drawings accompany and are a part of this disclosure. Such drawings depict preferred specific embodiments of the new means of the invention, and it is to be understood that these drawings are not to unduly limit the scope of my invention.

In the drawings,

FIG. 15 is a partial cross section view of the rear portion of the bed showing the linkage of the disconnecting arms which allow the rear portion to be raised.

FIG. 16 is an elevation view of the means of connecting the bucket booms and door frame members together at the rear portion of the bed for subsequent elevation and dumping.

FIG. 17 is a partial cross section of the gasket or seal at the rear portion of the bed.

15, showing a preferred manner of realigning the parts when the rear portion of the bed has been lowered.

Figure 23:
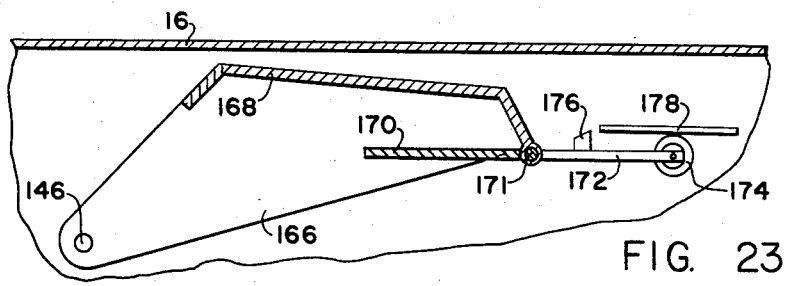
Figure 24:
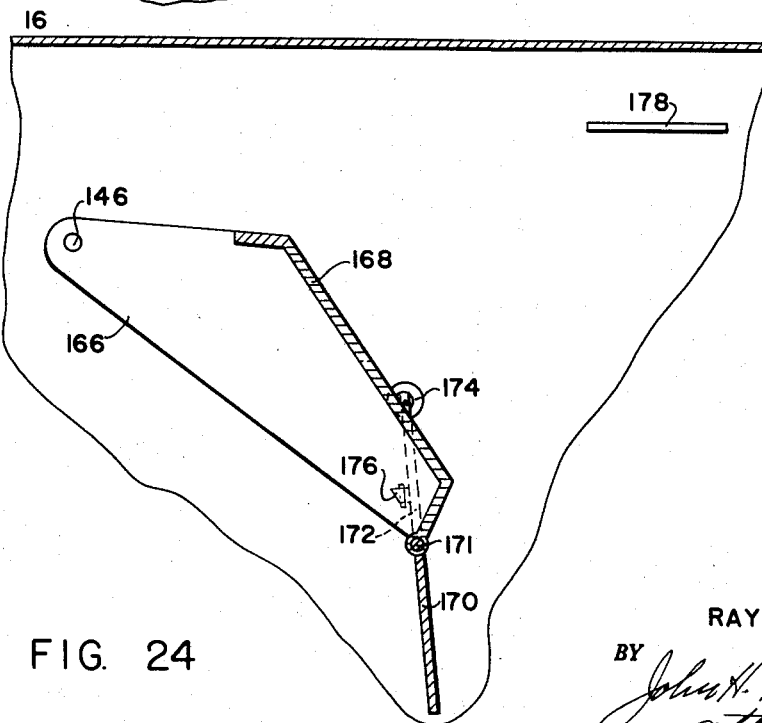

FIGS. 23 and 24 are detailed views of the gate and flap structure in the upper rear portion of the body.

The following is a discussion and description of the new refuse disposal and general truck bed of the invention. This discussion and description is made with reference to the drawings whereon the same reference numerals indicate like parts and structure. It is to be understood that this description and discussion is not to unduly limit the scope of the invention.

The refuse disposal and general truck bed of the invention, includes a body or bed 10 which consists of two sides 12 and 14, a top 16, a bottom 18, a closed front end 20 which is curved to meet top 16 and bottom 18, and a removable rear end indicated generally at 22. The bed or body 10 is tiltably mounted on a plurality of frame members 24 of a suitable self-propelled vehicle, such as a truck. The frame 24 is movably supported on a plurality of wheels 26 in the usual manner.

The mounting of the operating mechanism on the frame members 24 is best illustrated in FIGS. 6–8, 13 and 14. A longitudinally extending generally rectangular guide 28 is secured to the bottom 18 of the body or bed 10. The guide 28 has a slot 30 extending its full length on the underneath side thereof. The guide 28 is preferably secured between the frame members 24. A longitudinally extending, generally rectangular linking member 32 is received within guide 28 for reciprocation therein. The linking member 32 is pivotally secured at one end to the piston rod 34 of a double-acting hydraulic motor or servo-motor 36 by pivot pin 38. The other end of linking member 32 is pivotally secured to connecting rods 40 by pivot pin 42. Connecting rods 40, at the end remote from linking member 32, are pivotally connected to an operating arm 44 through pivot pin 46. The other end of operating arm 44 is rigidly secured to an axle 48. A tubular member 50 extends the whole width of the body or bed 10 along the lower side 18 thereof and is rigidly secured thereto and to the frame members 24. Tubular member 50 receives axle 48 for rotation therein, and axle 48 also extends the full width of the bed or body 10 and projects from the sides of the bed 10. Tubular member 50 is interrupted intermediate its end, to allow arm 44 to be rigidly joined to axle 48.

Figure 9:
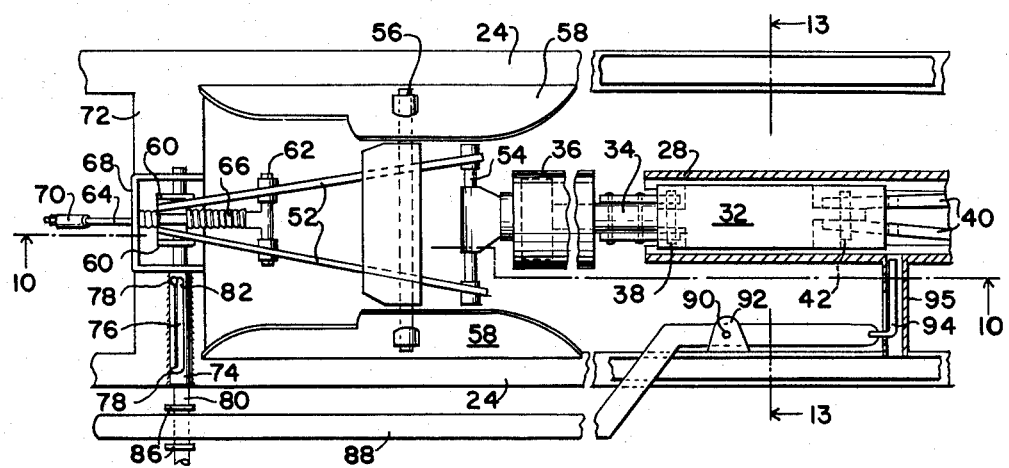
FIG. 9 is a top plan view of the hydraulic cylinder, slide, and spring mounted lifting device.
Figure 10:
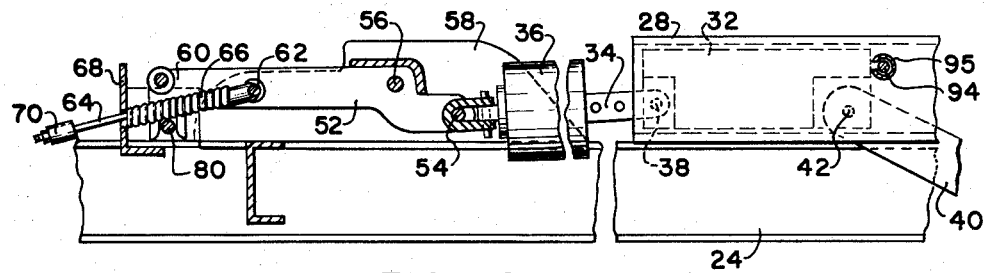
FIG. 10 is a cross section of the structure shown in FIG. 9 taken along the line 10—10.
Figure 11:
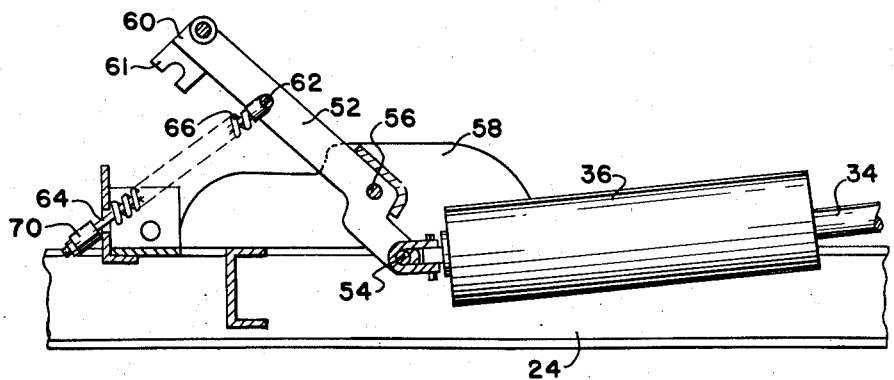
FIG. 11 is a cross sectional view of the same structure shown in FIG. 10, illustrating the position this structure assumes when the bed is partially raised.

As best shown in FIGS. 9, 10 and 11, the head end of the double-acting hydraulic motor or servo-motor 36 remote from slide 28 is pivotally secured to a pair of arms 52 by pivot pin 54. Arms 52 have pivot pin 56 extending therethrough to pivotally mount arms 52 on suitable supports 58 which are attached to the frame elements 24. Pivot pin 56 is nearer the bottom 18 of bed 10 than is the pin 54. The ends 60 of arms 52 remote from pivot 54 are secured together. The ends 60 have a depending flange 61 which has an arcuate portion removed from one edge thereof, through which releasing rod 80 passes as shown in FIG. 10. A pivot pin 62 extends between the arms 52 intermediate the ends 60 and pivot pin 56. An elongated bar 64 is joined to pivot pin 62 and has a spiral spring 66 thereon. The free end of rod 64 extends between the ends 60 of arms 52, through a bracket 68 and is threaded to receive an adjustable stop 70 thereon. The bracket 68 is preferably secured to cross members 72 of the frame. An elongated cylindrical guide 74 is rigidly secured to the cross member 72 and the frame member 24 on one side of the bracket 68. Cylindrical guide 74 has a longitudinally extending groove 76 formed in a portion thereof with short circumferentially extending grooves 78 on each end of the longitudinally extending groove 76. A releasing rod 80 is passed through cylindrical guide 74 and extends through both sides of the bracket 68 through apertures formed therein and through eyes or holes in brackets 81 which depend from the bottom 18 of the bed 10 and are rigidly secured thereto. An extension 82 projects from the releasing rod 80 through the grooves in guide 74 to guide and limit the movement of releasing rod 80. The other end of releasing rod 80 extends beyond the side of frame member 24 and has a handle 84 (FIG. 13) formed thereon. Two substantially circular guide plates 86 are rigidly secured to the releasing rod 80 between the handle 84 and cylindrical guide 74 and are spaced slightly from each other. An elongated bar 88 passes between guide plates 86, is bent intermediate its ends to cross over frame member 24, is bent again, and then extends generally parallel to frame member 24 to its other end. Bar 88 is pivoted intermediate its ends at 90 on a pair of brackets 92 which extend from the frame member 24 on either side of the bar. The end of bar 88 remote from guide plates 86 is secured to a second releasing rod 94 which slides in guide 95, and is adjacent the ends of linking member 32 and connecting rods 40.

Figure 18:
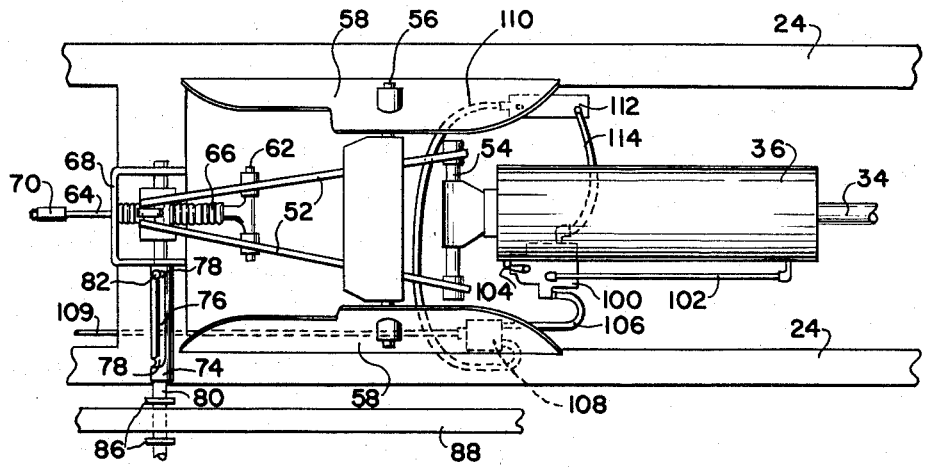
FIG. 18 is a plan view showing the storage tank, control valves and pump of the hydraulic system.

A four-way valve 100 (FIG. 18), of the usual construction, is suitably mounted between the frame members 24 in any convenient manner. Hydraulic hoses 102 and 104 extend from the four-way valve to the double-acting hydraulic motor 36. Another hydraulic hose 106 is attached to four-way valve 100 and to a hydraulic pump 108. The pump is operated by a power take-off from the transmission of the propelling vehicle which is indicated at 109. Another hose 110 connects the pump 108 to a source 112 of hydraulic fluid, and another hydraulic hose 114 is connected to the fluid source 112 and the four-way valve 100. Hydraulic fluid under pressure is thus supplied to the double-acting hydraulic motor 36 during the loading and dumping operations explained hereinafter, and is circulated from the pump 108 through the valve 100 and supply source 112 when motor 36 is not being used.

Figure 1:
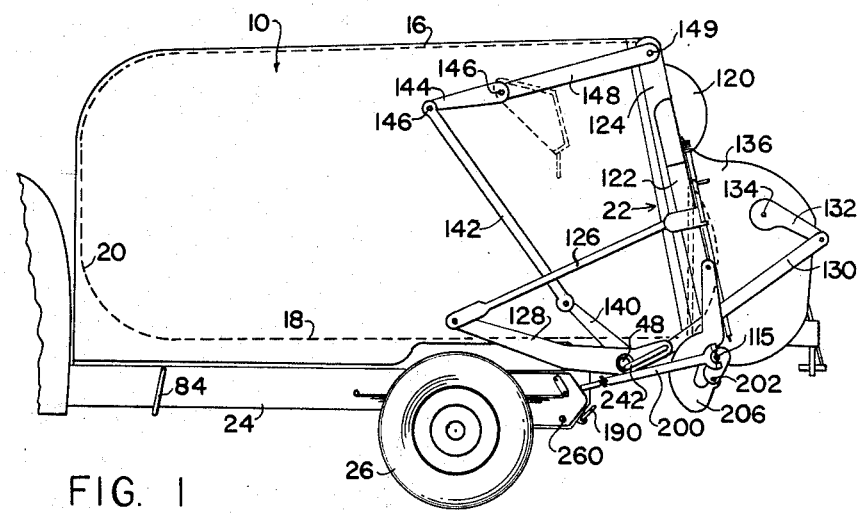
FIG. 1 is a longitudinal elevation of the invention in the closed or roadable position.
Figure 2:
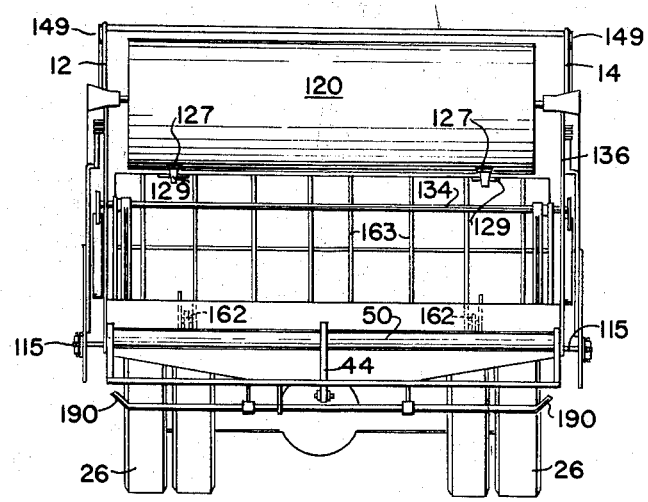
FIG. 2 is an end elevation of the device in the same position as shown in FIG. 1.
Figure 3:
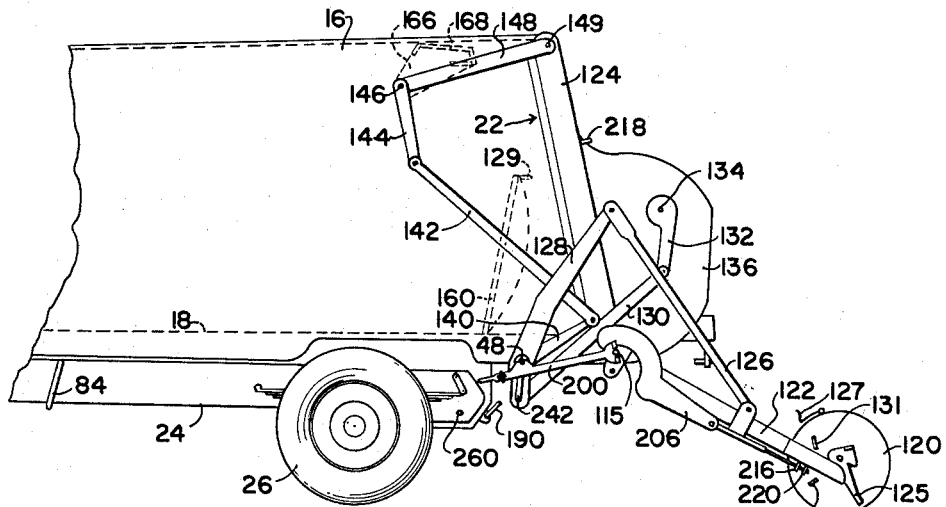
FIG. 3 is a partial longitudinal elevation of the device showing the bucket lowered to the ground position.

As best seen from FIGS. 1 and 3, a bucket 120 is pivotally mounted on booms 122 which in turn have their other ends pivotally secured to the axle 115 at the lower end of door frame member 124. Linking members 126 are pivotally joined at one end to an intermediate portion of the booms 122, and at their other ends to an end of lever arms 128. Lever arms 128 are rigidly secured near the other end to an end of axle 48 for rotation therewith. A portion of lever arms 128 extend beyond their connection with axle 48 and are pivotally joined at their ends to one end of connecting members 130, in a manner hereinafter described. Connecting members 130 pass between booms 122 and door frame members 124 and are connected at their other ends to arms 132 through a pivot connection. The arms 132 are rigidly secured to and rotates about an axle 134. Axle 134 extends arcoss the entire back side of the bed or body 10 through the sides of extending framework 136. As will be apparent from the preceding discussion, axle 134 will be rotated each time the bucket 120 is raised or lowered through the action of lever arms 128, connecting members 130, and arms 132. Axle 134 provides the drive means to operate the structure which pushes the material deposited by the bucket 120 in the body or bed 10 back into the end 20 of the bed. Additional levers 140 are rigidly secured to axle 48 for rotation therewith in the same manner as lever arms 128 previously described. Lever arms 140 are preferably between the connection of lever arms 128 and the sides 12 and 14 of the bed 10. Linking members 142 connect lever arms 140 and lever members 144 and are secured by pivot pins to an end of each of said members. The other end of arms 144 are rigidly secured to and pivot about axles 146 which passes through the sides 12 and 14 of the bed 10 and have structure described hereinafter secured thereto on the inside of the bed 10. The axles 146 also pass through support members 148 at one end of said members, and the other end of support members 148 is secured to the pivot 149 passing through the top end of door frame members 124. Axles 146 are rigidly secured to arms 144 for rotation therewith as arms 144 are moved by lever arms 140 and the linking members 142.

Figure 6:
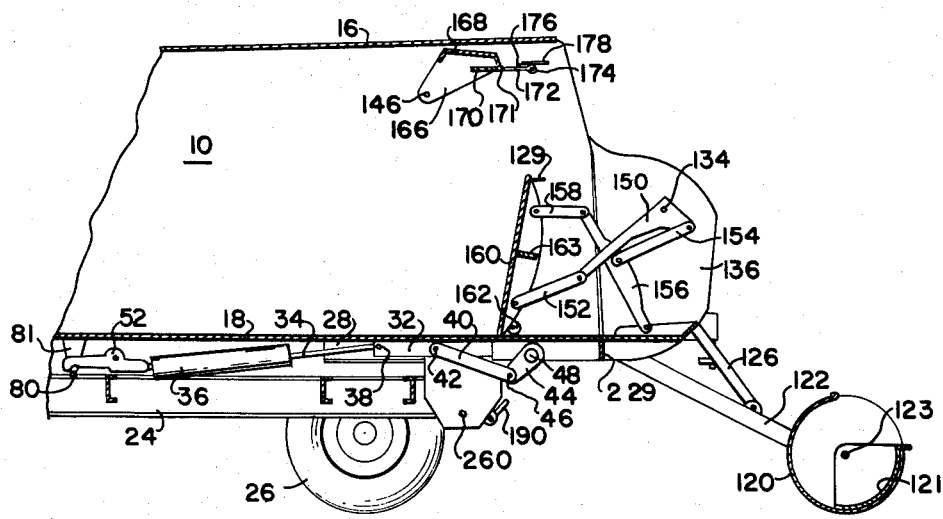
FIG. 6 is a partial longitudinal cross section of the device with bucket lowered to ground position.
Figure 7:
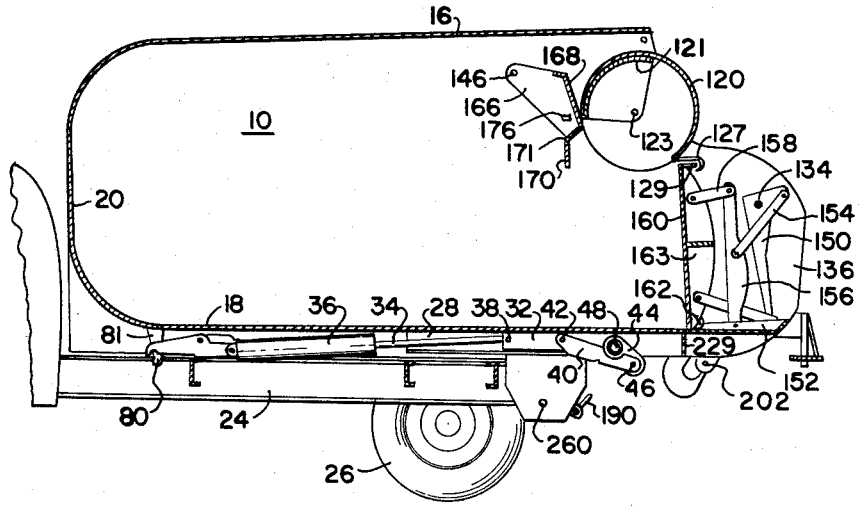
FIG. 7 is a partial longitudinal cross section of the device in a closed position.
Figure 8:
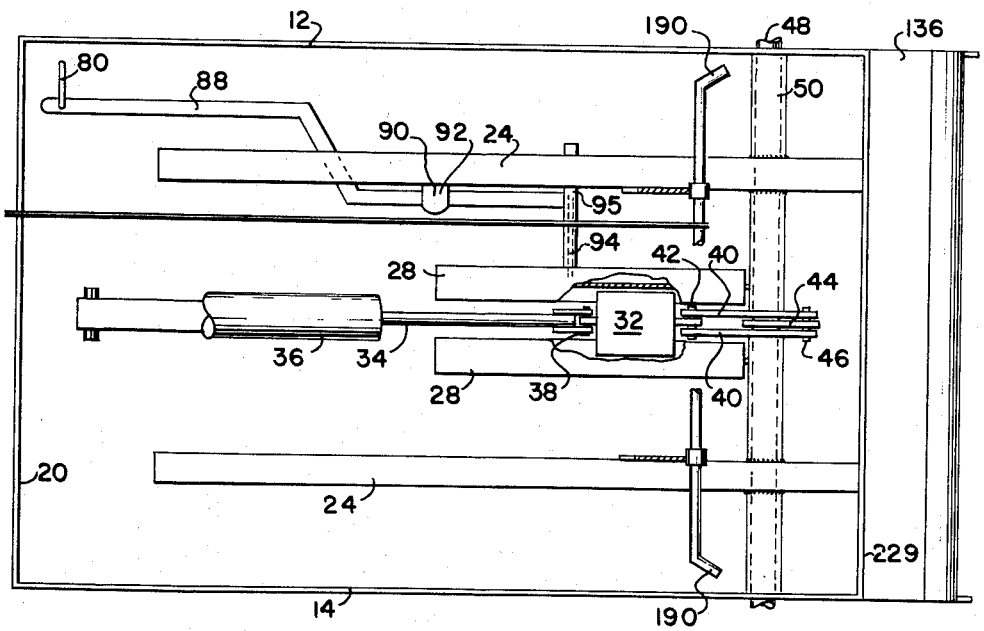
FIG. 8 is a bottom plan view of the bed.

The structure which moves the material deposited by bucket 120 into the bed 10 is best shown in FIGS. 6 and 7. Axle 134, previously described, passes through and is rigidly secured to operating arms 150. Operating arms 150 are generally L-shaped and are pivotally connected at the ends of the L to the ends of linking members 152 and 154. Linking members 154 in turn are pivotally connected to linking members 156 intermediate the ends thereof. Linking members 156 have one end pivotally connected to the bottom of the extending framework 136. The other end of linking members 156 are pivotally secured to linking members 158. Linking members 158 and 152 are both pivotally joined to the top and bottom respectively of a packing member 160 which is mounted on rollers 162. The operating arm 150 and linking members associated therewith are present on both ends of axle 134 and are so arranged that as the axle rotates in a clockwise direction as shown in FIGS. 6 and 7, a force will be exerted on the packer 160 which will cause it to move toward the end 20 of the bed 10. When the bucket 120 is in the dumping position the packer is retracted to its outermost position as shown in FIG. 7. As bucket 120 is lowered to the position shown in FIG. 6, the packer extends from the rear end of the bed 10, to perform its packing function. Suitable reinforcing elements 163 can be secured to the back of the packer 160 to give it additional strength if necessary.

As best shown in FIGS. 6, 7, 23 and 24, a generally triangular shaped plate 166, is mounted within the bed 10 on the inner end of axle 146 and is rigidly secured thereto for rotation therewith. Another plate 166 is mounted on the other side of the bed 10 on an axle 146 and, extending between and secured to each of said plates 166, is a gate 168. The gate 168 extends along the surface of the triangular shaped plates 166 remote from the axles 146. A longitudinally extending flap 170 is secured through pivot 171 to one edge of the gate 168. Two trip rods 172, each having a bearing 174 on the end thereof, are attached to each end of pivot 171, extend from the opposite side of pivot 171 and are rigid with the flap 170. A suitable stop 176 is secured to the trip rods 172. In operation, as the axle 146, plate 166 and gate 168 rotate in a clockwise direction as shown in FIGS. 6, 7, 23 and 24, the gate 168 and flap 170 will vary from a position generally parallel to the top 16 of bed 10 as shown in FIGS. 6 and 23 to a generally vertical position as shown in FIGS. 7 and 24. The gate and flap act together during this movement to force material in the top of bed 10 toward the rear thereof and prevent it from discharging through the opening in the bed through which the bucket 120 deposits material. The flap 170 should be in the position shown in FIGS. 7 and 24 when material is deposited in bed 10 by the bucket 120. The flap 170 is placed and held in the position shown in FIGS. 6 and 23 by the bearing 174, which engages a generally horizontally extending plate 178 secured to each side 12 and 14 of the bed 10 and rolls along its underside as plate 166 moves in a counterclockwise direction. When the plate 166 and gate 168 are moved in the clockwise direction, the force of gravity will allow the flap 170 to assume the position shown in FIGS. 7 and 24, and which, in effect, extends the working length of the gate 168 and forces an additional amount of material towards the rear 20 of the bed 10. Plate 166 is preferably bowed slightly from pivot 171 to axle 146 and the stop 176 engages the outside surface of plate 166 to limit the movement of the flap 170 in the counterclockwise direction about the pivot 171 as shown in FIG. 24.

A control arm 190 extends from both sides of the truck and is connected through suitable linkage, not shown, to the four-way valve 100 and to the controls in the cab of the truck as described later in connection with FIG. 19. To load the bed 10, the operator moves the control arm, which closes a valve in the four-way valve 100, thereby supplying fluid under pressure to the hydraulic motor 36. This forces the piston rod 34 into the end of the motor 36 which in turn forces link member 32 through guide 28. This force is transmitted through connecting rods 40 to arm 44 which in turn rotates axle 48. The rotation of axle 48 moves lever arms 128, linking members 126, and boom members 122 in a clockwise direction about axle 115 as shown in FIGS. 1 and 3. At the same time members 132 will be moved in a clockwise direction by the members 130, and axle 134, which is rigidly secured to members 132, will be rotated in the same direction. Lever arms 140, which are also rigidly secured to axle 48, will also be moved in a clockwise direction, and, through linkages 142 and 144, the axles 146 will be rotated in a counterclockwise direction. As bucket 120 is lowered to the ground, material previously deposited in the bed 10 will be forced towards the rear end 20 thereof by the axle 134 operating through the operating arms 150 and their associated linkage members on the packer 160, and the gate 168 which rotates with axles 146 will be raised to its uppermost position as shown in FIGS. 3 and 23. As will be obvious from FIG. 3, the bucket 120 is near the ground which facilitates loading of matter thereinto and prevents excessive lifting of heavy loads by the operator. When bucket 120 is filled, the position of the control arm is reversed, which in turn reverses the double acting motor 36, and, through the associated members, reverses the movement of axle 48. When this is done, the movements of lever arms 128, 140 and the associated structures hereinbefore described will be reversed and the bucket 120 will be rotated about the axle 115 on the lower end of booms 122 to the dumping position as illustrated in FIGS. 1 and 7. While the bucket 120 is being lifted, the packer 160 will be retracted, and the gate 168 moving in a clockwise direction about axles 146, together with the flap 170, will remove whatever materal may be in the upper end portion of bed 10 which would otherwise interfere with dumping of the material in bucket 120 into the bed.

The bucket 120 has a lid 121 thereon which is rotated about the same axis 123 as the bucket 120. The lid 121 and bucket 120 are mounted on concentric bearings in each side of the supporting structure in a manner well known in the art. A handle 125 on each end of bucket 120 is attached to the lid 121 through the ends of the bucket. A trip or catch 127 is secured to the top of bucket 120 adjacent the opening therein and spaced slightly from each end of the bucket. When bucket 120 is full, the lid 121 can be closed to prevent paper and similar matter from blowing therefrom during the loading operation. When the bucket is lifted as hereinbefore described, the handles 125 will engage protruding structure (not shown) on the sides 12 and 14 of bed 10 as the bucket reaches the dumping point, and the lid 121 will be held stationary as the bucket 120 is triped and rotated about axis 123. The trip 127 on the bucket 120 will engage projections 129, near the top of the packer 160, which will cause the bucket 120 to rotate about the axis 123 and thus rotate the bucket to the dumping position as shown in FIGS. 1 and 7. As shown in FIG. 3, stops 131 can be secured to each end of the bucket 120 on either side of the booms 122, which will engage booms 122 and prevent the bucket 120 in its extended position from rotating about axis 123 to such an extent as to deposit the material within the bucket 120 on the ground. This is of particular advantage when the entire vehicle is being moved with the bucket 120 in its position nearest the ground. Then as the vehicle hits bumps, rocks, etc. the bucket 120 will be free to move to a limited extent only.

For unloading the bed 10, provision has been made for securing the loading assembly to the rear door frame members so that the entire rear end of the bed can be lifted out of the way, at which time the entire bed is tilted about its axis 260 and material therein is deposited on the ground by gravity. The manner of attaching the structure at the rear of the bed together for lifting prior to the dumping operation is best seen in FIG. 16. An arm 200 has been provided which is secured to axle 115, about which booms 122 rotate during the loading operation, by a pivot pin 202 which extends through axle 115. A portion of arm 200 is cut away about the axle 115 so that the arm 200 may be rotated about axle 115 on either the axis of pin 202, or about the axis of axle 115. A connecting member 204 is rigidly secured to the axle 115 for rotation therewith. Member 204 is slightly out of round, and is pivotally joined near its outer edge to a hook shaped element 206 at one end thereof. The element 206 is shaped in this manner so that it will not interfere with the member 200 during the movements described hereinafter. The other end of hook shaped element 206 is secured to a cylindrical rod 208 which is received for reciprocation within a cylindrical guide 210 on the side of boom 122 near its connection with member 126. The cylindrical guide 210 has a slot 212 therein through which the cylindrical rod 208 and hook shaped element 206 are secured together and which serves to guide and limit the travel of cylindrical rod 208. The cylindrical rod 208 extends from the end of cylindrical guide 210, is bent twice at 90 degree angles at 209, and extends into a second cylindrical guide 214. The guide 214 is generally parallel to guide 210, is secured to the side of boom 122, and is adjacent the side of extending framework 136. When the bucket 120 is in the position shown in FIG. 1, three eyes, 216, 218 and 220 will be in line with the upper end of guide 214 and be concentric with the axis of guide 214. The eyes 216, 218 and 220 are then adjacent to each other and adjacent to the upper end of cylindrical guide 214. The eyes 216 and 220 are rigidly secured to boom 122 and the eye 218, which is between eyes 216 and 220, is secured to extending framework 136. To secure the boom 122 to the door frame member 124, the arm 200 is rotated about the axis of axle 115 in the direction indicated by the arrow in FIG. 16. Connecting member 204 is rotated with arm 200 and urges the hook shaped element 206 upwardly. The guide rod 208, which is secured to the hooked shaped element 206, will move through cylindrical guides 210 and 214 and through the eyes 216, 218 and 220 as shown by the arrows in FIG. 16. At the same time, a flange, not shown, which is secured to the back face of element 206, will be received within a groove in the lower edge of member 130 to keep member 130 and the associated packer structure in place during the lifting operation. Since the structure for operating the packer 160 is secured to the extending framework 136, which in turn is secured to the door frame member 124, the locking of the boom 122 to the extending framework 136 results in all the structure at the rear end of the bed 10 being secured together on door frame member 124 for rotation about the pivot 149 at the upper end of door frame member 124. The connecting structure previously described is preferably on the side 12 of the bed 10, and is duplicated on side 14 with the exception of arm 200, which is not necessary there since the rotation of this arm is transmitted to the connecting member 204 on the other side through axle 115. The hook shaped element 206 on the side 12 can be a straight member on side 14 since arm 200 is eliminated and there fore interference with the arm 200 is not present.

Figures 19, 20, 21:
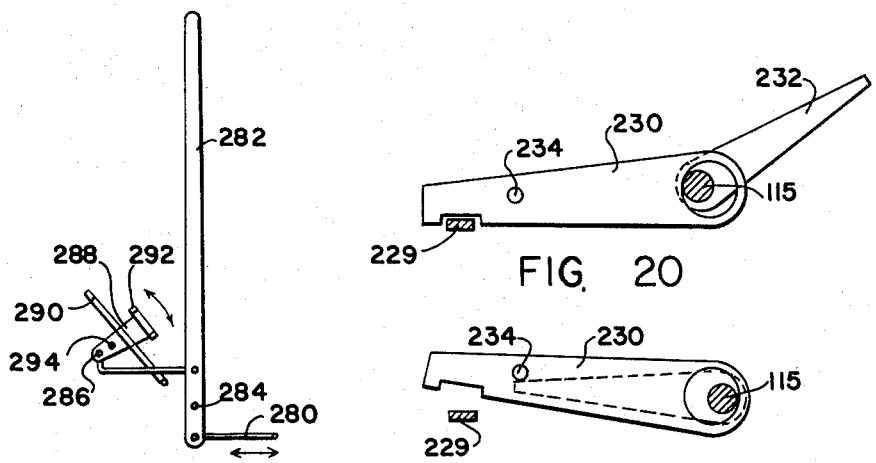
FIG. 19 is a schematic view showing the operating lever in the cab of the truck and the means of accellerating the motor.
FIG. 20 illustrates the means of securing the lower portion of the removable back end of the bed to the frame of the supporting truck.
FIG. 21 illustrates the preferred manner of disengaging the structure indicated in FIG. 20.

The bottom of extending framework 136 is secured to a cross member 229 at the rear end of the frame of the truck body by a hook 230 as shown in FIGS. 20 and 21. The hook 230 is released from engagement with the cross member 229 upon the rotation of arm 200 about axle 115 as previously described. The hook 230 surrounds the axle 115 and is eccentrically mounted thereon. An arm 232 adjacent to hook member 230 is rigidly secured to the axle 115. As arm 200 moves in the direction shown by the arrow in FIG. 16, the arm 232 rotates with the axle 115 and engages an abutment 234 on the side of the hook 230 which lifts the hook 230 from engagement with cross member 229. The eccentric mounting of hook 230 on axle 115 will loosen its grip on the cross member 229 as arm 232 rotates clockwise to disengage it, and will tighten its grip when the movement of arm 232 is reversed.

Figure 4:
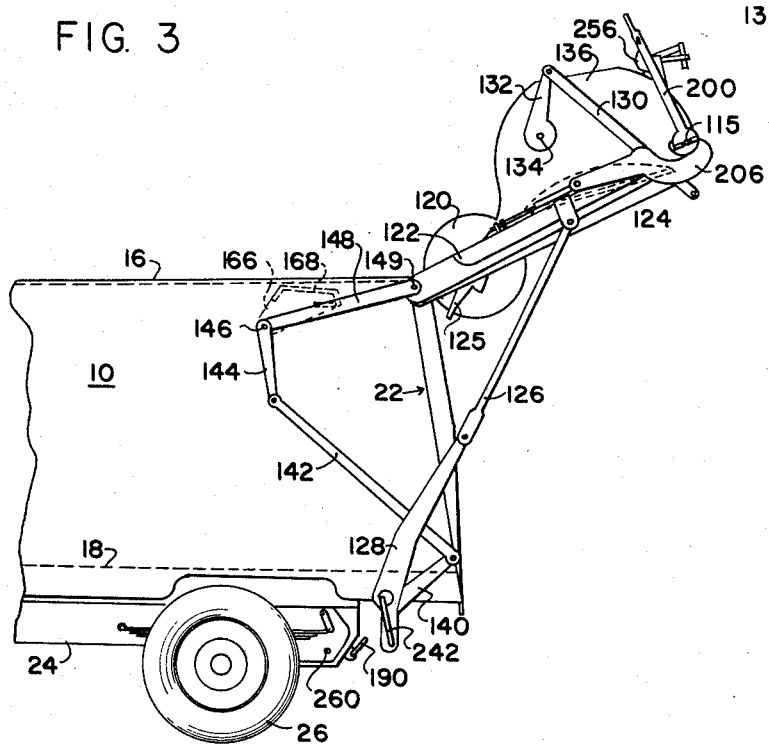
FIG. 4 is a partial longitudinal elevation of the device showing the rear portion of the bed open.

As will be observed from comparison of FIGS. 1 and 4, it is necessary to disengage the connecting member 130 from the lever arm 128 prior to lifting the rear end of bed 10 for dumping. This is easily accomplished by the structure shown in FIGS. 15 and 22. The end of lever arm 128 which receives connecting member 130 is bifurcated as shown in FIG. 15, and retains connecting member 130 therein by the rod 240 which passes therethrough. The rod 240 is secured to one end of a longitudinal extending plate 242 which has its other end rigidly secured to another rod 244 which projects through plate 242 into axle 48. A pivot pin 246 is secured inside the axle 48 near the end of the axle adjacent rod 244 and has pivotally mounted thereon a short, longitudinally extending plate or rod 248. The plate or rod 248 is pivotally secured to the rod 244 at one end thereof and has its other end secured to a longitudinally extending rod 250 which extends the length of axle 48 and projects from the other end thereof. The other end of rod 250 is secured to the end of a plate 252 which is similar to plate 242 except that it is slightly longer. Plate 252 is a longitudinally extending plate and is secured at its other end to a rod 240 as previously described. To disengage connecting member 130 from lever arm 128 an operator need merely pull plate 242 or rod 244 away from the lever arm 128. This disengages the rod 240 on one side, and through rod 244, pivot pin 246, the plate or rod 248 and rod 250, the plate 252 at the other side of the vehicle acts on rod 240 to disengage the connecting member 130 from the lever arm 128 at that side. This operation is performed after the guide rod 208 has been extended through cylindrical guides 214 and the eyes 216, 218 and 220 by the arm 200 being rotated approximately 180 degrees in the direction shown by the arrow in FIG. 16. To facilitate movement of the plate 242 or rod 244 and the associated structure, the arm 200 can be rotated about the axis of pivot pin 202 approximately 180 degrees at which point the flange 256 on the arm 200 will lie under the rod 244. A suitable groove or projection, not shown in the drawing, can be provided on the underside of rod 244 which can be engaged by the flange 256 on arm 200 to provide whatever leverage may be necessary to move the plate 242 and the associated rods. After this operation is performed, the arm 200 is again rotated approximately 180 degrees about the pivot pin 202 and secured in any suitable manner to the extending framework 136 in order that it will not fly loose during the lifting of the rear end of the truck and injure the operator.

Figure 5:
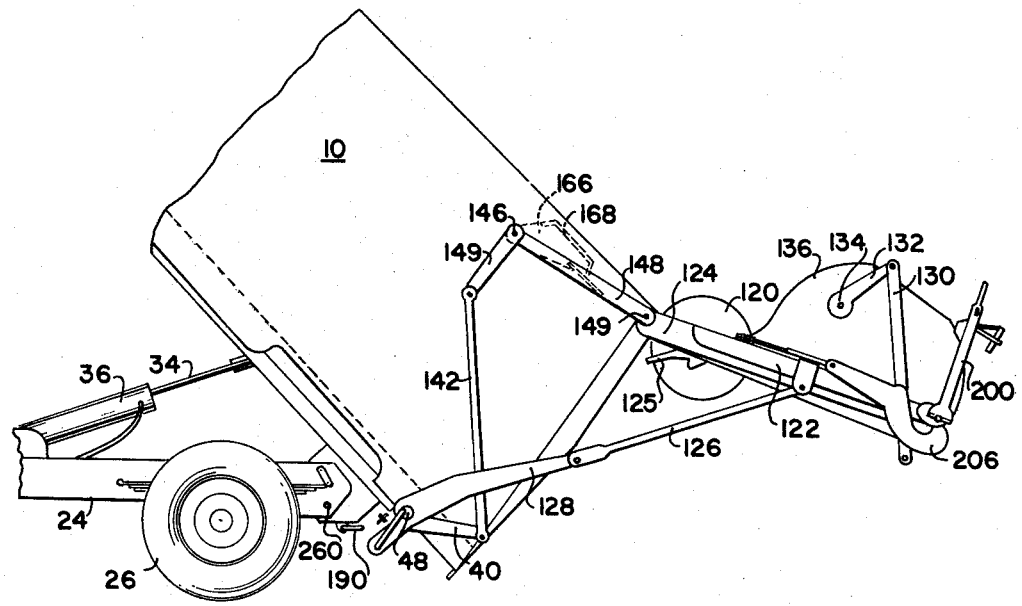
FIG. 5 is a partial longitudinal elevation of the device in the dumping position.
Figure 12:
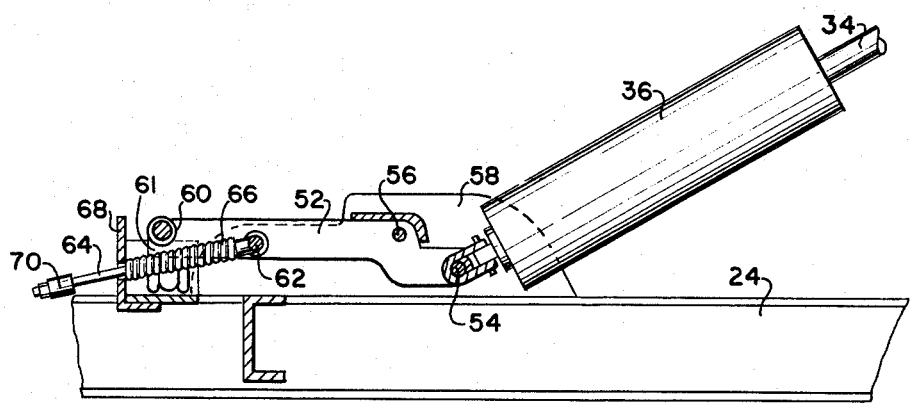
FIG. 12 is a cross section of the spring mounted lifting device and hydraulic cylinder with the bed in dumping position.
Figure 13:
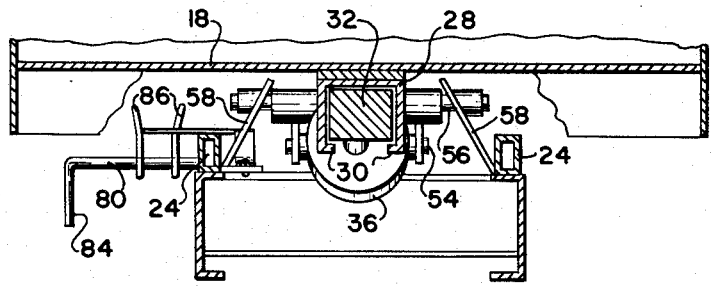
FIG. 13 is a cross section view taken along the line 13—13 of FIG. 9.
Figure 14:
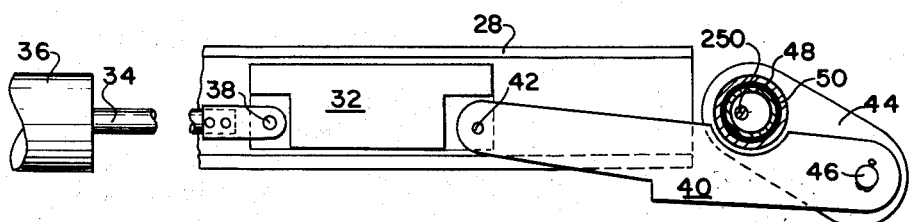
FIG. 14 is a cross section view showing the hydraulic cylinder, the linking member and the operating arm.

When the preceding adjustments have been made, the rear end of the bed 10 is now ready for elevation to the position shown in FIG. 4. To accomplish this the control arm 190 is operated in the same direction it is to lower the bucket 120. When this is done the axle 48 will be rotated in a clockwise direction when viewed as in FIGS. 1 and 4, and the lever arms 128, which are rigidly secured to the axle 48, will also be rotated in a clockwise direction. As lever arms 128 are rotated, a force will be applied to the boom members 122, and since these members, and the rest of the structure at the rear end of the bed 10, are now rigidly secured to the door frame members 124, this force will urge all the structure at the rear end of the bed 10 in an arcuate direction, pivoting about the pivot 149 at the upper end of door frame members 124. As the axle 48 rotates, the rear end of bed 10 will move from the position shown in FIG. 1 to the position shown in FIG. 4. The rear end of the bed 10 is now entirely open and ready for dumping. The releasing rod 80 (FIG. 9) is now rotated by the operator until the extension 82 can be moved from its innermost position in groove 76 to the other end of cylindrical guide 74 at which time the extension 82 is placed in the groove 78 by rotating the releasing rod. This disengages the first releasing rod from the eyes in the flanges 81 on the bottom of the bed. As the releasing rod is moved, the guide plates 86 will move the bar 88 in the same direction at the end of the bar 88 adjacent the guide plate, and by virtue of the pivot 90, the other end of bar 88 will be moved in the opposite direction. This movement of bar 88 moves the second releasing rod 94 through guide 28 at a point immediately behind linking member 32. With the second releasing rod 94 in this position any further movement of the linking member 32 will be prevented. The entire bed 10 is mounted for rotation about an axle 260 which, as will be apparent from FIGS. 3–7 of the drawings, is substantially lower than the horizontal plane of the double acting hydraulic motor 36 and the associated structure which rotates the axle 48. This as control arm 190 is again rotated to activate the double acting or servo-motor 36, the hydraulic force exerted on piston rod 34 will urge the bed 10 about the axis of axle 260. Immediately prior to the lifting operation the hydraulic parts are in the positions indicated in FIG. 10. As the double acting motor 36 is activated and a force is applied against piston rod 34, the head end of the double acting motor 36 will be urged against the pivot 54. The force thus transmitted will be received by the arms 52 which in turn will rotate about the pivot 56, thus urging the ends 60 of the arms 52 in a vertical direction to the position indicated in FIG. 11. The ends 60 will thus exert a lifting force against the bottom 18 of the bed 10 as it begins its vertical movement, and will materially aid the piston rod 34 in the initial stages of the lifting and rotating operation, and the angle of thrust will become more vertical. As bed 10 is further rotated about the axle 260, the center of gravity of the bed 10 will eventually reach a position where a pulling force is exerted on the piston rod 34. When this occurs, the head end of the double acting motor 36 adjacent the pivot 54 will be pulled in a direction opposite to that just described, and the arms 52 will move in the opposite direction about pivot 56 until the position shown in FIG. 12 is reached. As the ends 60 of arms 52 descend, the spring 66 will engage the end of the bracket 68 and be compressed, thereby allowing the ends 60 of arms 52 to be gently returned to the position of FIG. 12. The stop 70, previously described, limits the upward movement of arms 52 as shown in FIG. 11. When the bed 10 has rotated about axle 260 to its furthermost point, the material within bed 10 will be removed therefrom by the force of gravity. To return the bed 10 from the position shown in FIG. 5 to the position shown in FIG. 4, the control arm 190 is moved in the opposite direction, which operates on four-way valve 100 to reverse the flow of fluid through double acting motor 36, which will then retract piston rod 34 into the double acting motor 36, and the bed 10 will be rotated in a counterclockwise direction about the axle 260. When the center of gravity of the bed 10 moves about axle 260 to a point where the weight of the bed 10 is applied to the piston 34, this force will be applied through double acting motor 36 to move the arms 52 from the position showing FIG. 12 to the position showing FIG. 11, and the ends 60 of the arms 52 will engage the bottom of bed 10 as it descends and thus aid in gently lowering the bed 10 onto the frame 24. The hydraulic apparatus will then be in the position showing FIG. 10, and the bed and lifting structure will be in the position shown in FIG. 4. The releasing rod 80 is then rotated to move extension 82 out of one circumferential groove 78 in cylindrical guide 74, and is then moved along the slot 76 so that the extension 82 moves to the other circumferential groove 78 and then the releasing rod 80 is again rotated to maintain it in position engaged in locking relation with brackets 81. During the previously described movement of releasing rod 80, the bar 88 will be moved by the guides 86 which are secured to the releasing rod 80, and this movement will disengage the second releasing rod 94 from its position behind linking member 32. Movement of the control arm 190 will activate double acting motor 36 which will again be free to operate on the axle 48 through the associated linking structure, and lever arm 128 will then be rotated, which in turn will lower the rear end of the bed 10 from the position shown in FIG. 4 to the position shown in FIG. 1.

Figure 22:
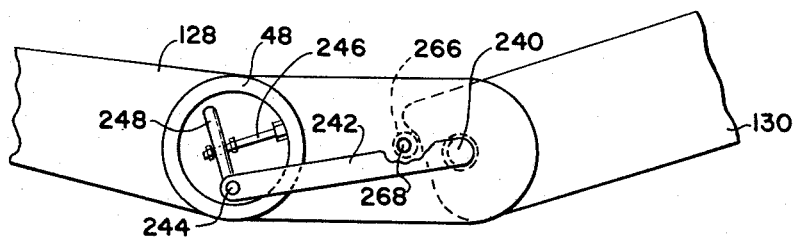
FIG. 22 is a side view of the linkage illustarted in FIG.

In order that the member 130 will assume its proper relation in regard to lever arm 128 to receive the rod 240 therethrough when the rear end is lowered, the end of member 130 is formed into a generally S-shaped curve as shown in FIG. 22. The end of member 130 will engage a bearing or bushing 266 which is mounted between the two bifurcated portions of lever arm 128 on a pin 268. As member 130 is lowered, its S-shaped end will roll along the bearing or bushing 266 and will thus be guided into its proper position to receive rod 240. With member 130 thus properly aligned between the bifurcated end of lever arm 128, the operator presses the plate 242 toward the bed.

Movement of the plate 242 will cause members 244, 250 and 252 to be moved, which in turn will cause pins 240 to move through the aligned apertures in the bifurcated end of lever arm 128 and the member 130 at both sides of the bed 10. The arm 200 can then be rotated approximately 180 degrees about axle 115 to its original position as shown in FIG. 16. The movement of arm 200 will cause the associated members 204 and the hooked shaped elements 206 to be moved, which in turn will withdraw the rods 208 from the eyes 216, 218 and 220. Arm 200 will again be retained by suitable structure on the bed 10 to prevent its accidental displacement. When these adjustments have been made the device is again ready for the loading operation previously described.

In order that the bed 10 may be made watertight so that water or liquids can be retained therein, provision is made for sealing the rear end of the bed which raises and lowers for dumping and the part of the bed 10 which it engages when the device is in the loading position. This seal is illustrated in FIG. 17. The seal 270, which may be made of rubber, synthetic rubber, plastics, or any other suitable sealing material, is secured to the bed 10 by bolts, rivets, or other retaining means shown at 272. The seal 270 extends along the lower side of the back of the bed 10 and up along both sides to a suitable height. When the door frame members 124 are in position against the rear end of bed 10 they will abut, and be forced against the seal 270, thereby effectively sealing the bed 10 for reception of liquids. Hooks 230, previously described, help hold the parts in sealing relation.

As previously indicated the control arm 190 extends to either side of the bed 10 in order that the device may be operated from either position. The control arm 190 is connected through a suitable linkage to the accelerator of the truck so that the speed of the motor can be increased as the arm is moved and thereby increase the speed of the pump 108. The manner in which this is accomplished is indicated in FIG. 19. Control arm 190 is connected through suitable linkage to the rod 280 which moves in response to the movements of control arm 190. The rod 280 is pivotally joined to another control arm 282 under the cab of the truck. The control arm 282 is passed through the floor of the cab, is secured to the body of the truck by a pivot pin 284, and has a connecting rod 286 secured thereto. Connecting rod 286 is pivoted at one end to the control arm 282 and at the other end is joined to plate 288. Plate 288 is pivotally connected at 294 to the floor of the cab adjacent the accelerator 290. A generally flat plate 292 is rigidly secured to the plate 288 and overlies a portion of the accelerator 290. Rod 280 is moved in the direction shown by the arrows in FIG. 19 in response to the movement of control arm 190, and this movement is transferred through control arm 282, the connecting rod 286, and plate 288 to the plate 292. As the plate 292 is thus moved about the axis of the pin 294 it will engage either the upper or lower portion of the accelerator 290 to thereby automatically increase the motor speed in response to the movement of the control arm 190. Since pump 108 is driven by a power take off from the vehicle transmission, its speed will also be varied in this manner. As will be apparaent from the foregoing description of FIG. 19, the control arm 282 can also be used to operate the device. Movement of control arm 282 will be transmitted through rod 280 and the associated linkages to operate the four-way valve 100.

As will be apparent from the description of the preferred specific embodiment hereinbefore described, the refuse disposal and general truck bed of this invention can easily be operated by a single individual from either side or the cab of the truck with a minimum of effort. The loading and dumping operations are controlled from a single set of controls and utilize one double-acting motor for the entire operation. The bed is watertight and thereby overcomes objections of health and sanitary officials to many of the prior art devices. The same lever arm and linking members which raise the bucket for loading also lift the entire rear end of the device for unloading, thereby preventing duplicate structures and decreasing the cost of the device. Means are also provided to force materials deposited in the bed by the bucket towards the closed end of the bed during each cycle of the loading operation. This prevents material from falling or being blown from the rear end of the bed 10 while the bucket is nearest the ground. The bucket has been provided with a lid which may be closed while it is nearest the ground to prevent papers, etc. from being accidentally removed. The lid will automatically open when the bucket is raised to the dumping position.

As will be evident to those skilled in the art, various modifications of my invention can be made, or followed, in the light of this disclosure and discussion, without departing from the spirit or scope of the disclosure, or from the scope of the claims.

I claim:
1. A vehicle having self-loading and dumping apparatus comprising, in combination: a frame mounted on wheels; a body bed tiltably mounted on said frame from a point in the rear end portion thereof and open in its rear end portion; a door frame member mounted along each side of the open end of said body and pivotally secured thereto near the top of said body in their upper end portions; a bucket supported on each side thereof by booms pivotally secured to the lower ends of said door frame members, said bucket having tripable lid means to cover the open portion thereof and said bucket adapted to convey and dump material therein upwardly and forwardly from ground level into the upper portion of the rear portion of said bed; rearwardly extending framework having sides and a bottom mounted at the rear of said bed and secured to said door frame members; an axle transversely mounted in the upper portions of said sides of said extending framework, a packer movably mounted through pivotally connected links to said bottom of said extending framework and to said axle passing through the upper part of said extending framework, said packer constructed and adapted to move forward into said bed upon the lowering of said bucket to crush material dumped into said bed from said bucket and to move said material forward in said bed, adapted to move rearwardly into a retracted position in said extending framework upon the raising of said bucket to dump material into said bed and having means therewith to catch and trip said bucket when it is raised to the dump position, and adapted to swing outwardly with said extending framework when the bed is tilted to dump material therefrom; a gate extending across the inside of said bed and rigidly attached at its ends to axles which project through the sides of said bed near the top rear of said bed, a longitudinally extending flap rigidly secured to a pivot on the edge of said gate nearest the rear end of said bed for rotation therewith, a plate mounted on the inside of a side of said bed, a trip rod rigidly secured to each end of said pivot opposing said flap and adapted to engage said plate on the side of said bed to thereby rotate said flap to a position generally parallel to said gate when said gate moves from a generally vertical to a generally horizontal position as said bucket is being lowered, said gate and flap extending and rotating about the gate axles to move material dumped into said bed by said bucket forward in said bed as said bucket is raised; a linking member reciprocally mounted in guide means secured to the underneath side of said body; a servo-motor mounted on said frame, the rod of said motor being pivotally attached to said linking member in one end portion thereof to reciprocate same; a tubular member secured to the bottom of said bed, an operating axle rotatively mounted in said tubular member and extending the full width of said bed and projecting from the sides of said bed and having an operating arm extending therefrom intermediate the ends of said axle, a connecting link pivotally secured in one end portion to said operating arm and in the other end portion to the other end portion of said linking member, said operating axle being rotated when said linking member is reciprocated by said motor; a first pair of lever arms and each end of said operating axle having one of same rigidly secured thereto intermediate the ends of said arms, one end of said first pair of lever arms being connected through linking members to an intermediate portion of said booms supporting said bucket and the other end of said first pair of lever arms being removably connected through pivotally attached linking members to said axle through said extending framework, a second pair of lever arms and each end of said operating axle having one of same rigidly secured thereto at one end of said arms, the other ends of said second pair of lever arms being connected through linking members to the outside end of the gate axles; said pairs of lever arms constructed and adapted to lower and raise said bucket and to move said packer forward and backward in said bed, and to rotate said gate and flap, respectively, upon reciprocation of said first-named linking member; securing means mounted on said booms adapted to slide into eyes on said booms and on said extending framework to prevent relative movement therebetween; means for releasing said first pair of lever arms from said linking members attached to said axle of the extending framework so that said booms, said extending framework and said door frame members, when secured together, can be rotated about the pivotal connection of said bed and said door frame members to open the rear end of said bed for dumping; a first releasing means having a rod operator mounted on said frame, brackets attached to said body, and said releasing rod engageable therein to lock said bed in down position, a pair of arms pivotally secured at one end to the head end of said motor, the other end of said arms being joined together and overlying said first releasing rod, said arms being pivotally secured intermediate their ends to said frame at a higher vertical point than said pivotal connection to said head end of said motor so that as said rod of said motor is extended the ends of said arms which are secured together will be urged against the underneath side of said bed; a second releasing means having a rod operator mounted on said frame and connected thereto a longitudinally extending bar and operable to pass through apertures in said guide to a position adjacent the end of said linking member remote from said motor to lock said linking member against rearward movement, the other end of said bar being received between guide plates mounted on said first releasing rod, said bar being pivotally connected intermediate its ends to said frame so that as said first releasing rod is released from engagement with said brackets said rod operator of the other releasing means will be moved by said bar through said guide to its position adjacent said linking member; said device being so constructed that when said booms, door frame members and extending framework are rotated about the pivotal connection of the door frame members and the bed to open the rear end of the bed, and the second releasing rod has been moved to the position to prevent rearward movement of the linking member, then movement of the motor will be directed against the underneath side of the bed to thereby tilt said bed on said frame and thus remove material in the bed therefrom.

2. Self-loading and dumping apparatus for a vehicle having a body open in its rear end portion and tiltably mounted on a frame, which comprises, in combination: door frame members, a bucket supported by boom means which are pivotally secured to said door frame member at its lower end thereof; extending framework secured to said door frame member, a first axle through said extending framework, a packer secured to said extending framework and to said first axle passing therethrough; linking means reciprocably mounted on said body; motor means attached to and adapted to reciprocate said linking means; a second axle rotatably secured to said body, said second axle extending to the sides of said body and being rotated by the reciprocation of said linking means; lever means attached to the end portions of said second axle beyond said sides of said body and at the ends to said boom means and said first axle, said lever means adapted upon movement of said linking means in one direction to raise said bucket to dump material therein into said body and to retract said packer member into closed position within the extending framework and disposed in a position to trip said bucket, and said lever means adapted upon movement of said linking means in the opposite direction to lower said bucket and extend said packer into said body to crush and push material therein forward; gate means mountable within said body and extending thereacross in the upper portion thereof, said gate means being operatively connected to said second axle so that when said axle is rotated said gate means will be moved within said body to move material therein forward; means to lock said linking means against movement; and said body adapted to be tilted upon locking said linking means and exerting force thereon by said motor means to move same.

3. Self loading and dumping apparatus for a vehicle having a tiltably mounted body with an open end comprising, in combination, door frame members pivotally secured to the open end of said body and having extending framework secured thereto; bucket means pivotally mounted on said door frame members, packing means mounted on said extending framework and adapted to extend therefrom, an axle rotatably secured to the bottom of said body, lever means mounted on said axle and operatively connected to said bucket means and said packing means, said lever means adapted upon movement in one direction to raise said bucket means to position to dump material therein into said body, to retract said packing means into closed position and to trip said bucket means, and said lever means adapted upon movement in the other direction to lower said bucket means and extend said packing means into said body to contact material therein; movable linking means operably connected to said axle; motor means attached to said linking means adapted to move same and in turn move said axle and said lever means; means to lock said linking means against movement; and said body being tiltable upon locking said linking means and exerting force thereon with said motor means; a gate extending across said body near the top and rear end thereof and secured to gate axles at its ends, said gate axles extending through the sides of said body, additional lever means secured to said axle which is attached to the bottom of said body for movement therewith, said additional lever means attached to said gate axles so that as said bucket means is lowered said gate means is moved to a position near the top of said body, and as said bucket means is raised said gate means is moved to a generally vertical position, thereby moving material in said body.

References Cited in the file of this patent

UNITED STATES PATENTS

| | | |
|---|---|---|
| 2,557,003 | Le Laurin | June 12, 1951 |
| 2,750,056 | Dow | June 12, 1956 |

FOREIGN PATENTS

| | | |
|---|---|---|
| 649,350 | Germany | Aug. 26, 1937 |